US006576179B1

United States Patent
Abe et al.

(10) Patent No.: US 6,576,179 B1
(45) Date of Patent: Jun. 10, 2003

(54) INJECTION MOLDING PROCESS USING A PAIR OF RESERVOIRS AND AN INJECTION DEVICE

(75) Inventors: Masaharu Abe, Otake (JP); Hiroshi Yamamoto, Hiroshima (JP); Kyoichi Nakamura, Yamaguchi-ken (JP)

(73) Assignees: Toda Kogyo Corporation, Hiroshima-ken (JP); The Japan Steel Works, Ltd., Tokyo (JP)

( * ) Notice: Subject to any disclaimer, the term of this patent is extended or adjusted under 35 U.S.C. 154(b) by 381 days.

(21) Appl. No.: 09/613,283

(22) Filed: Jul. 10, 2000

(30) Foreign Application Priority Data

Jul. 12, 1999 (JP) ............................................. 11-197276

(51) Int. Cl.[7] ............................................. B29C 45/54
(52) U.S. Cl. ............................. 264/328.18; 264/328.19; 425/557; 425/560
(58) Field of Search ................... 264/328.18, 328.19, 264/297.2; 425/557, 130, 131.1, 560, 257, 558, 559

(56) References Cited

U.S. PATENT DOCUMENTS 3,916,038 A * 10/1975 Yamaguchi et al. ..... 252/62.54
4,256,986 A * 3/1981 Anderson ................... 310/155
5,200,207 A * 4/1993 Akselrud et al. ........... 425/130
6,042,757 A * 3/2000 Abe et al. ...................... 264/28
6,071,462 A * 6/2000 Putsch ................... 264/328.14
6,109,909 A * 8/2000 Morita ................... 264/328.19

* cited by examiner

Primary Examiner—Jill L. Heitbrink
Assistant Examiner—Monica A Fontaine
(74) Attorney, Agent, or Firm—Nixon & Vanderhye P.C.

(57) ABSTRACT

An injection-molding process including kneading functional particles with a binder resin in a kneader, temporarily storing the kneaded material supplied from the kneader in a reservoir device and feeding the kneaded material stored in the reservoir device to an injection device, the reservoir device including a pair of reservoirs, the kneaded material stored in one reservoir device is fed to the injection device where the kneaded material is then injection-molded, and simultaneously the kneaded material is fed from the kneader to another reservoir device and stored in it. Then, the kneaded material stored in the other reservoir device is fed to the injection device where the kneaded material is then injection-molded, and simultaneously the kneaded material is fed from the kneader to the one reservoir device and stored in it, so that the injection molding process is conducted by alternately repeating the above steps by switching operations. This injection-molding process is capable of producing a molded product of uniform quality by preventing feed pressure of the kneaded material fed to an injection device from being transmitted to the kneader.

8 Claims, 11 Drawing Sheets

INJECTION MOLDING PROCESS USING A PAIR OF RESERVOIRS AND AN INJECTION DEVICE

BACKGROUND OF THE INVENTION

The present invention relates to an injection molding process and an apparatus therefor, and more particularly, related to a process for injection-molding a composite rein composition composed of particles and a binder resin, and an injection-molding machine used therefor.

Conventionally, as an injection-molding process and apparatus of such a type, there are known those described in Japanese Patent Application Laid-Open (KOKAI) No. 9-295329(1997).

As shown in FIG. 11, an injection-molding machine of the prior art is constituted by a kneader 1 for kneading a mixed starting material to be kneaded, an injection device 2 for injection-molding the kneaded material, a reservoir device 3 for temporarily storing the kneaded material to be fed to the injection device 2, and a switching valve (directional control valve) 4 being switchable between one position where the kneaded material is fed to the reservoir device 3 and another position where the kneaded material is fed to the injection device 2.

The kneader 1 is constituted by a heating barrel 5, an extrusion screw 6 which is mounted in the barrel so as to be rotatably driven by, for example, an oil motor, and a hopper 7 for feeding a raw material to be kneaded, which is fitted onto an outside of the heating barrel.

The injection device 2 is constituted by a heating barrel 8, an injection screw 9 which is mounted in the barrel so as to be rotatably driven by, for example, an oil motor and reciprocatively moved by a piston, and an injection nozzle 10 which is provided at a distal end thereof. Upon metering, a metering space 11 is formed on the front side of the injection screw 9 in the heating barrel 8.

The reservoir device 3 is constituted by a reservoir chamber 12 in which an extrusion plunger 13 is accommodated so as to be reciprocatively driven by a piston in the vertical direction. When the extrusion plunger 13 is moved upward, a storage space 14 is formed in the reservoir chamber 12 underneath the extrusion plunger 13.

The switching valve 4 is of a rotary type and has a valve body through which a straight passage for the kneaded material is formed.

An outlet (or inlet) 16 of the reservoir device 3 and an inlet 17 of the switching valve 4 are connected with each other through a passage 18, and an outlet 19 of the switching valve 4 and an inlet 20 of the injection device 2 are connected with each other through a passage 21. Further, a discharge end of the kneader 1 is opened into the mid-position of the passage 18 such that the kneader 1 is inclined downwardly toward the passage 18.

When performing the injection molding process using the above injection molding machine, the switching valve 4 is held in the closed position as shown in FIG. 11 (refer to a broken line in FIG. 11), and the kneader 1 is operated, thereby introducing the kneaded material into the reservoir device 3 through the passage 18. At this time, the extrusion plunger 13 is caused to move upward by the pressure of the kneaded material introduced, so that the kneaded material is temporarily stored in the storage space 14 formed underneath the extrusion plunger 13.

Then, the switching valve 4 is opened, and after a predetermined period of time therefrom, the extrusion plunger 13 is moved downward, thereby forcing the kneaded material to discharge downward from the storage space 14. The discharged kneaded material is merged (jointed) with a kneaded material freshly supplied from the kneader 1. The jointed kneaded material is then fed to the injection screw 9 of the injection device 2 through the switching valve 4, and the injection screw 9 is retarded, thereby transferring the kneaded material into the metering space 11 thus formed on the front side of the injection screw 9 to store the material therein.

Subsequently, as shown in FIG. 12, the switching valve 4 is closed, and the injection screw 9 is stopped to rotate and is allowed to move forward, whereby the kneaded material is injected through the injection nozzle 10 to obtain an aimed injection-molded product.

During the above injection molding step, the kneader 1 supplies a fresh kneaded material into the reservoir device 3 through the passage 18. The extrusion plunger 13 is forced to move upward by the pressure of the kneaded material introduced, so that the kneaded material is temporarily stored in the storage space 14 formed underneath the extrusion plunger 13.

Thus, the injection molding machine is returned to the initial condition as shown in FIG. 11, and subsequently the above operations are repeated.

However, in the conventional injection molding machine and injection molding process, when the kneaded material is discharged from the storage space 14 of the reservoir device 3 by the extrusion plunger 13 and introduced into the injection device 2, the extrusion pressure exerted by the extrusion plunger 13 is transmitted through the passage 18 to the kneader 1. For this reason, when the extrusion pressure acts on the kneader 1, the torque of the extrusion screw 6 is temporarily increased, thereby failing to perform a stable kneading operation in the kneader 1.

Further, the extrusion pressure tends to cause a reverse flow of the kneaded material from the reservoir device 3 through the passage 18 into the kneader 1. In such a case, the kneaded materials having different heat histories are disadvantageously mixed together upon kneading.

Accordingly, in the conventional injection molding machines and processes, there arise problems such as non-uniform quality of obtained injection molded products due to such an unstable injection molding process.

As a result of the present inventors' earnest studies for solving the above problems, it has been found that using an injection molding machine having a pair of reservoir devices for temporarily storing a kneaded material, by (a) kneading particles and a binder resin using a kneader, (b) feeding the obtained kneaded material to one (A) of the two reservoir devices, (c) feeding the kneaded material stored in the reservoir device (A) to an injection device, and simultaneously feeding the kneaded material from the kneader to another reservoir device (B) to store the material therein, (d) feeding the kneaded material stored in the reservoir device (B) to the injection device, and simultaneously feeding the kneaded material from the kneader to the said one reservoir device (A) to store the material therein, and (e) repeating the steps (c) and (d), the obtained injection-molded product is free from uneven properties and can exhibit a good quality. The present invention has been attained on the basis of this finding.

SUMMARY OF THE INVENTION

It is an object of the present invention to provide an improved injection molding process and injection molding machine, wherein the kneading can be stably conducted without being adversely affected by the feed pressure from the reservoir devices.

It is an another object of the present invention to provide an improved injection molding process and injection molding machine, wherein it is possible to obtain an injection-molded product which is free from uneven properties and can exhibit a good quality.

To accomplish the aims, in a first aspect of the present invention, there is provided a process for injection-molding a composite resin composition, comprising:

(a) kneading particles and a binder resin using a kneader;
(b) feeding the obtained kneaded material to one (A) of two reservoir devices to store the material therein;
(c) feeding the kneaded material stored in the reservoir device (A) to an injection device wherein the kneaded material is then injection-molded, and simultaneously feeding the kneaded material from the kneader to another reservoir device (B) to store the material therein;
(d) feeding the kneaded material stored in the reservoir device (B) to the injection device wherein the kneaded material is then injection-molded, and simultaneously feeding the kneaded material from the kneader to said one reservoir device (A) to store the material therein; and
(e) repeating the steps (c) and (d).

In a second aspect of the present invention, there is provided an injection-molding machine comprising:

a kneader for kneading particles with a binder resin;
a pair of reservoir devices (A) and (B) for temporarily storing the kneaded material supplied from the kneader;
an injection device for injection-molding the kneaded material, the kneaded materials temporarily stored in the reservoir devices (A) and (B) being alternately fed to the injection device;
a reservoir switching means connected between the kneader and the pair of reservoir devices (A) and (B), which are switchable for alternately storing the kneaded material in the reservoir devices (A) and (B); and
a feed switching means connected between the pair of reservoir devices (A) and (B) and the injection device, which are switchable for alternately feeding the kneaded material from the reservoir devices (A) and (B) to the injection device.

In a third aspect of the present invention, there is provided an injection molded product comprising particles and a binder resin, produced by a process comprising:

(a) kneading particles and a binder resin using a kneader;
(b) feeding the obtained kneaded material to one (A) of two reservoir devices to store the material therein;
(c) feeding the kneaded material stored in the reservoir device (A) to an injection device wherein the kneaded material is then injection-molded, and simultaneously feeding the kneaded material from the kneader to another reservoir device (B) to store the material therein;
(d) feeding the kneaded material stored in the reservoir device (B) to the injection device wherein the kneaded material is then injection-molded, and simultaneously feeding the kneaded material from the kneader to said one reservoir device (A) to store the material therein; and
(e) repeating the steps (c) and (d).

DETAILED DESCRIPTION OF THE INVENTION

The preferred embodiments of the present invention will now be described with reference to the accompanying drawings. However, these preferred embodiments are only illustrative, and it is not intended to limit the invention thereto.

Figure 1:
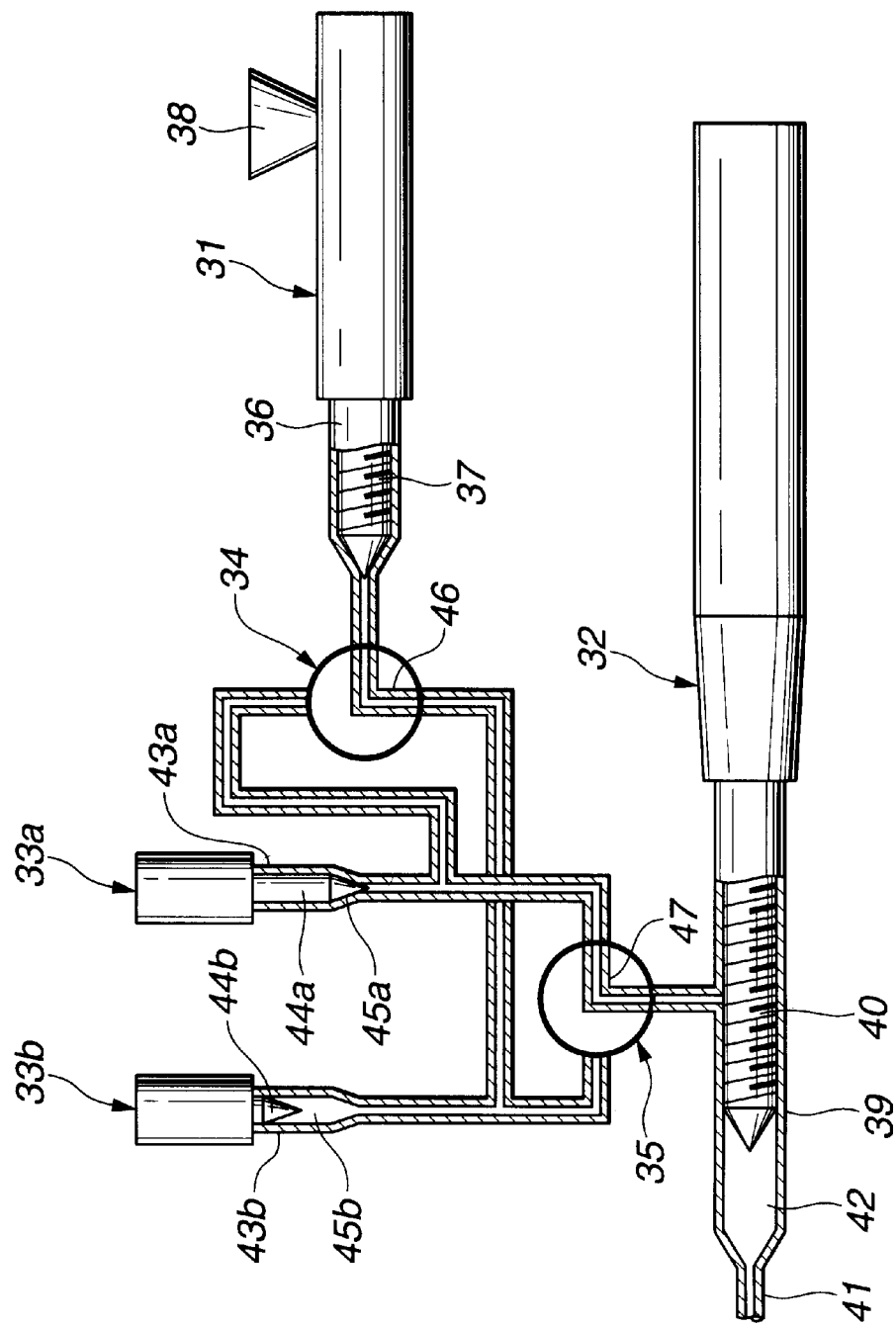
FIG. 1 is a side view of an injection molding machine, showing a first step of the process according to a first preferred embodiment of the present invention.

Referring to FIG. 1, there is shown an injection molding machine according to a first preferred embodiment of the present invention. The injection molding machine comprises a kneader 31 for kneading a raw material, an injection device 32 for injection-molding a kneaded material; a pair of reservoir devices 33a and 33b for alternately conducting temporary storage of the kneaded material supplied from the kneader 31 and feed of the kneaded material to the injection device 32; a reservoir switching means 34 connected between the kneader 31 and the pair of reservoir devices 33a and 33b and being switchable between one position where the kneaded material from the kneader is received in the reservoir device 33a and another position where the kneaded material is received in the reservoir device 33b; and a feed switching means 35 connected between the pair of reservoir devices 33a and 33b and the injection device 32 and being switchable between one position where the kneaded material is fed from the reservoir device 33a to the injection device 32 and another position where the kneaded material is fed from the reservoir device 33b to the injection device 32.

The kneader 31 comprises a heating barrel 36, an extrusion screw 37 mounted in the barrel so as to be driven by, for example, an oil motor, and a hopper 38 for feeding a raw material to be kneaded, which is fitted to an outside of the heating barrel.

The raw material to be kneaded may be in the form of particles or pellets composed of particles such as functional particles and a binder resin.

The injection device 32 comprises a heating barrel 39, an injection screw 40 mounted in the barrel so as to rotatably driven by, for example, an oil motor and being reciprocatively moved by a piston in the forward and rearward directions, and an injection nozzle 41 which is provided at a distal end thereof. Upon metering, a metering space 42 is formed in the heating barrel 39 on the front side of the injection screw 40.

The pair of reservoir devices 33a and 33b has a reservoir chamber 43a and 43b, respectively. Within the respective reservoir chambers 43a and 43b, extrusion plungers 44a and 44b are accommodated so as to be reciprocatively driven by a piston in the vertical direction. When the extrusion plunger 44a or 44b is moved upward, a storage space 45a or 45b is formed in the reservoir chamber 43a or 43b underneath the extrusion plunger 44a or 44b.

The reservoir switching means 34 and the feed switching means 35 are respectively constituted by as directional control valves, rotary type valves each having a valve body through which an L-shaped or arcuate passage 46 or 47 for the kneaded material is formed.

Figure 2:
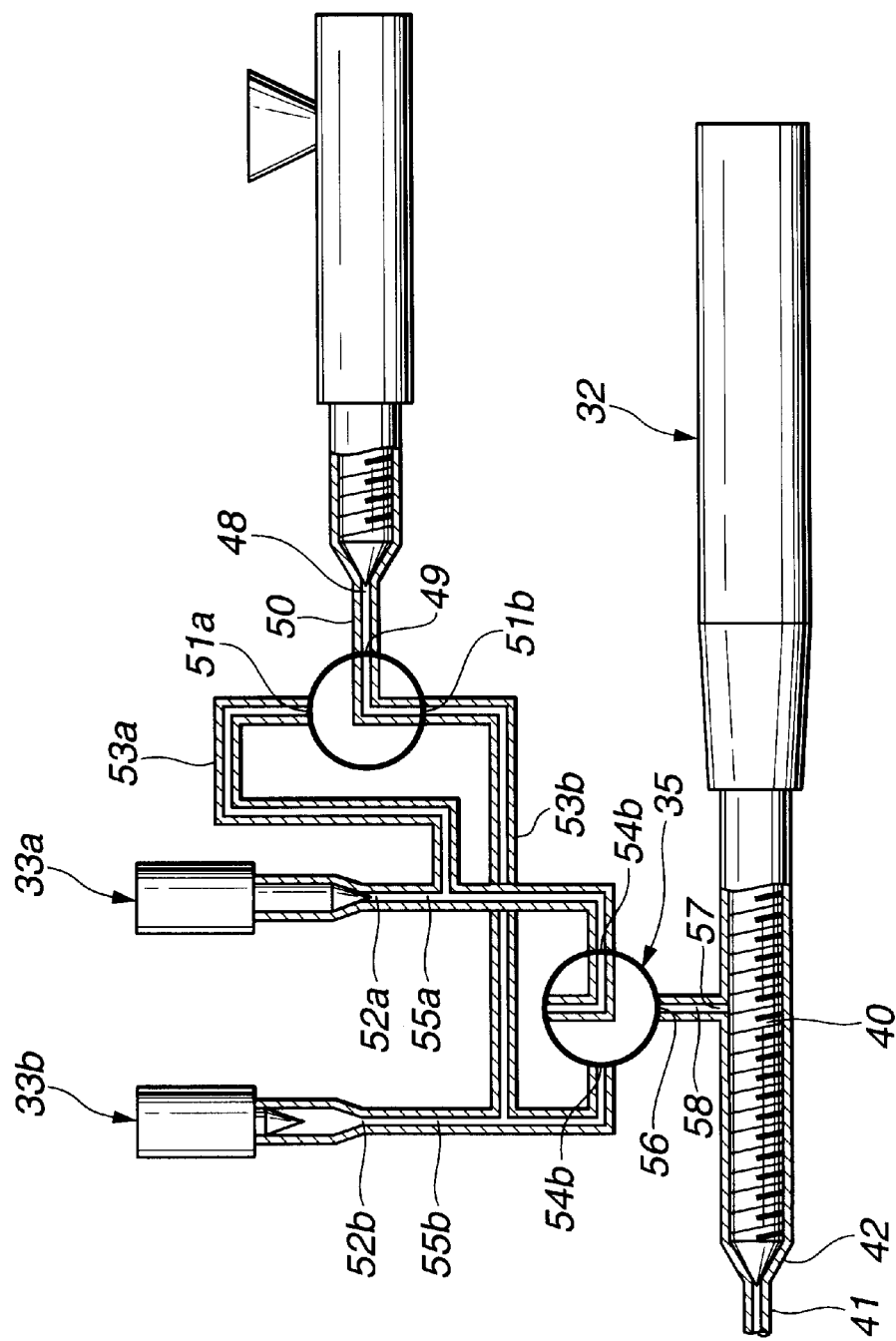
FIG. 2 is a side view of an injection molding machine, showing a second step of the process according to a first preferred embodiment of the present invention.

As shown in FIG. 2, an outlet 48 of the kneader 31 and an inlet 49 of the switching valve (directional control valve) 34 are connected with each other through a passage 50, and outlets 51a and 51b of the switching valve 34 are connected with inlets (or outlets) 52a and 52b of the reservoir devices 33a and 33b through passages 53a and 53b, respectively. Further, the inlets (or outlets) 52a and 52b of the reservoir devices 33a and 33b are connected with inlets 54a and 54b of the switching valve (directional control valve) 35 through passages 55a and 55b, respectively, and an outlet 56 of the switching valve 35 is connected with an inlet of the injection device 32 through a passage 58.

Next, the injection molding process using the above-described apparatus is explained with reference to FIGS. 1 to 4 in the order of sequential steps.

Through the whole steps, the kneader 31 is continuously operated to alternately feed the kneaded material to the pair of reservoir devices 33a and 33b.

In the feeding step as shown in FIG. 1, the extrusion plunger 44a of one reservoir device (A) 33a is lowered to discharge the kneaded material already stored in the storage space 45a and fed the material into the injection device 32 through the switching valve 35. At this time, the reservoir device (A) 33a is disconnected from the kneader 31 by the switching valve 34.

Another reservoir device (B) 33b is connected to the kneader 31 through the switching valve 34 and supplied with the kneaded material therefrom. The pressure of the kneaded material introduced forces the extrusion plunger 44b to move upward, so that a storage space 45b is formed underneath the extrusion plunger 44b and the kneaded material is temporarily stored therein. At this time, the reservoir device (B) 33b is disconnected from the injection device 32 by the switching valve 35.

The injection screw 40 of the injection device 32 is retarded while rotating, so that a metering space 42 is formed on the front side of the injection screw 40. This allows a necessary amount of the kneaded material to be introduced from the reservoir device (A) 33a into the metering space 42 of the injection device 32.

In the successive injection step as shown in FIG. 2, the injection device 32 is disconnected with both the reservoir devices (A) and (B) 33a, 33b by the switching valve 35. The injection screw 40 is moved forward by an piston disposed inside the injection device, so that the kneaded material stored in the metering space 42 is injection-molded through an injection nozzle 41.

Figure 3:
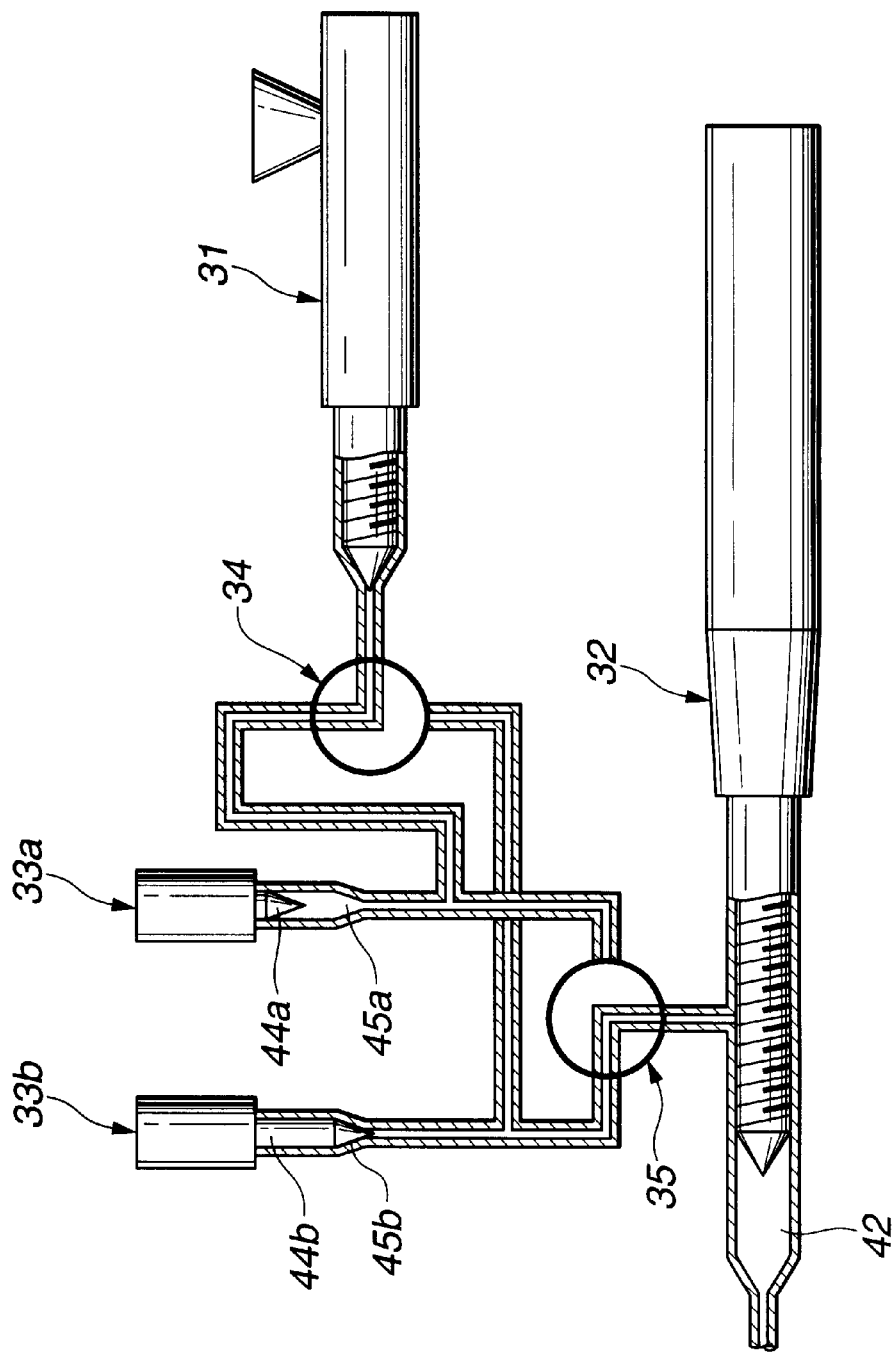
FIG. 3 is a side view of an injection molding machine, showing a third step of the process according to a first preferred embodiment of the present invention.

In a further feeding step as shown in FIG. 3, the reservoir device (A) 33a is connected with the kneader 31 through the switching valve 34, so that the kneaded material is fed thereto from the kneader 31. The thus introduced kneaded material is temporarily stored in the storage space 45 formed due to the upward movement of the extrusion plunger 44a.

On the contrary, at this stage, the reservoir device (B) 33b is disconnected from the kneader 31 by the switching valve 34. Immediately before the next injection step, the reservoir device (B) 33b is connected with the injection device 32 through the switching valve 35, and the extrusion plunger 44b is lowered, so that the kneaded material stored in the storage space 45b is fed into the injection device 32.

The kneaded material is introduced from the reservoir device (B) 33b into the metering space 42 of the injection device 32 in the same manner as shown in FIG. 1.

Figure 4:
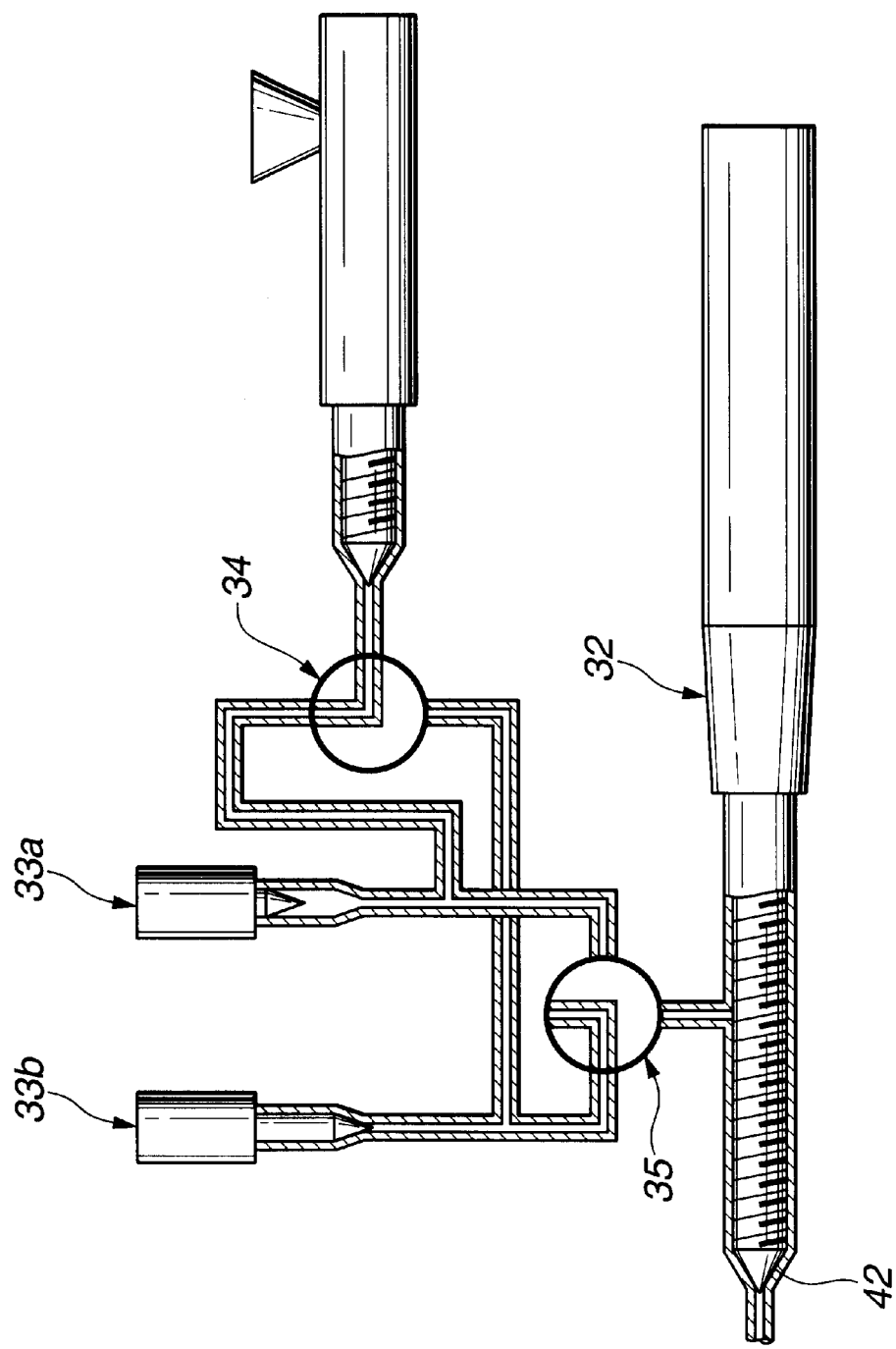
FIG. 4 is a side view of an injection molding machine, showing a fourth step of the process according to a first preferred embodiment of the present invention.

In the successive injection step as shown in FIG. 4, the injection device 32 is disconnected from both the reservoir devices (A) and (B) 33a, 33b by the switching valve 35, so that the kneaded material stored in the metering space 42 is injection-molded in the same manner as shown in FIG. 2.

After conducting the injection step, the process is returned to the initial step as shown in FIG. 1 by actuating both the switching valves 34 and 35. Subsequently, the above operations are repeated.

In accordance with the above-described apparatus and process, when the kneaded material is fed from the reservoir device (A) or (B) 33a, 33b into the injection device 32, the kneader 31 is prevented from being adversely affected by the feed pressure or other disturbance factors, thereby producing a uniform and stable kneaded material therein. This results in production of injection-molded products having an excellent and stable quality.

Figure 5:
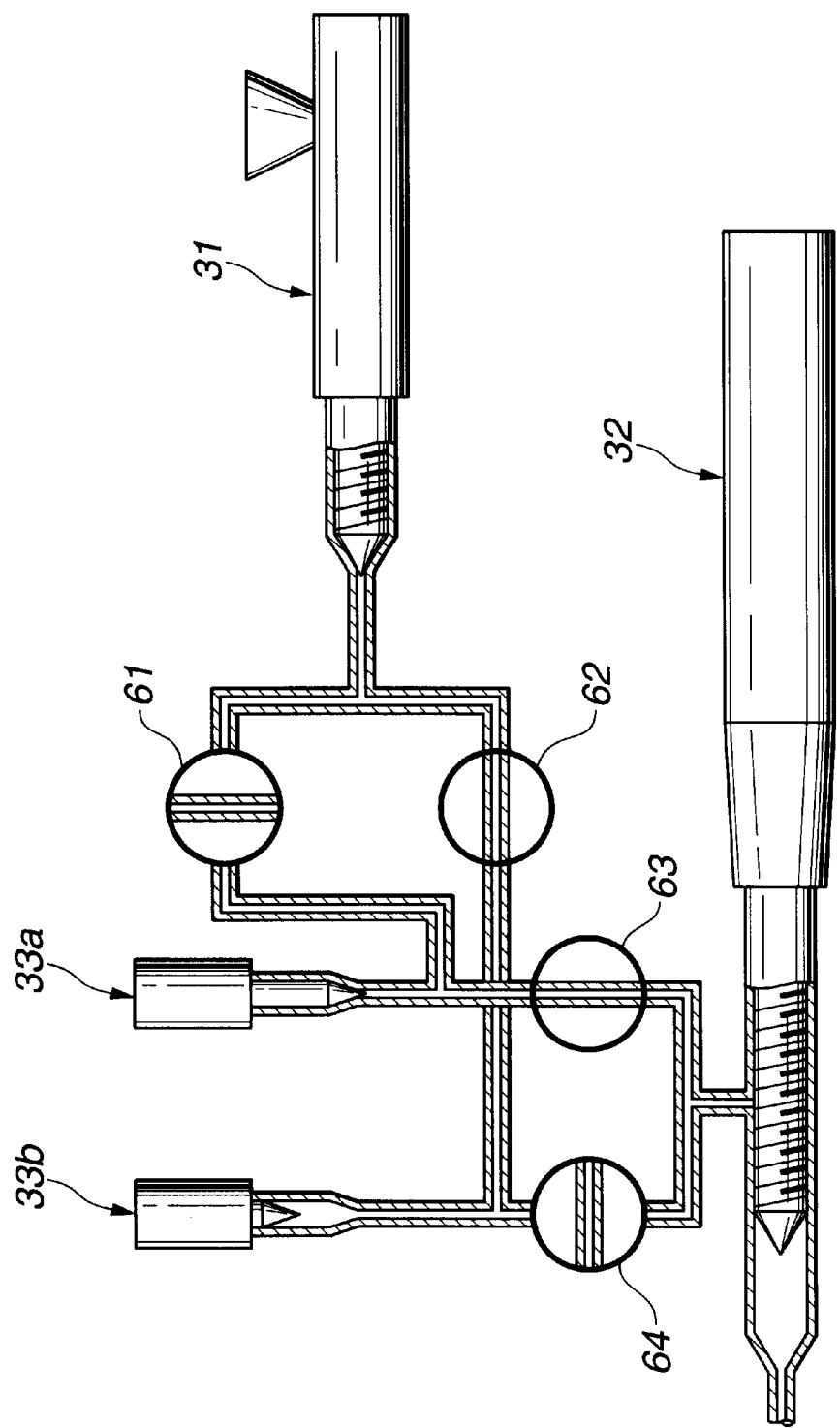
FIG. 5 is a side view of an injection molding machine, showing a first step of the process according to a second preferred embodiment of the present invention.

In an injection molding machine according to a second preferred embodiment of the present invention, as shown in FIG. 5, the reservoir switching means 34 of the first preferred embodiment is replaced with two switching valves 61 and 62, and the feed switching means 35 is replaced with two switching valves 63 and 64.

As shown in FIG. 5, the switching valve 61 is arranged so as to switchably establish or prohibit the connection between the kneader 31 and one reservoir device (A) 33a, and the switching valve (directional control valve) 62 is arranged so as to switchably establish or prohibit the connection between the kneader 31 and another reservoir (B) 33b. Also, the switching valve (directional control valve) 63 is arranged so as to switchably establish or prohibit the connection between the reservoir (A) 33a and the injection device 32, and the switching valve 64 is arranged so as to switchably establish or prohibit the connection between the reservoir (B) 33b and the injection device 32.

Figure 6:
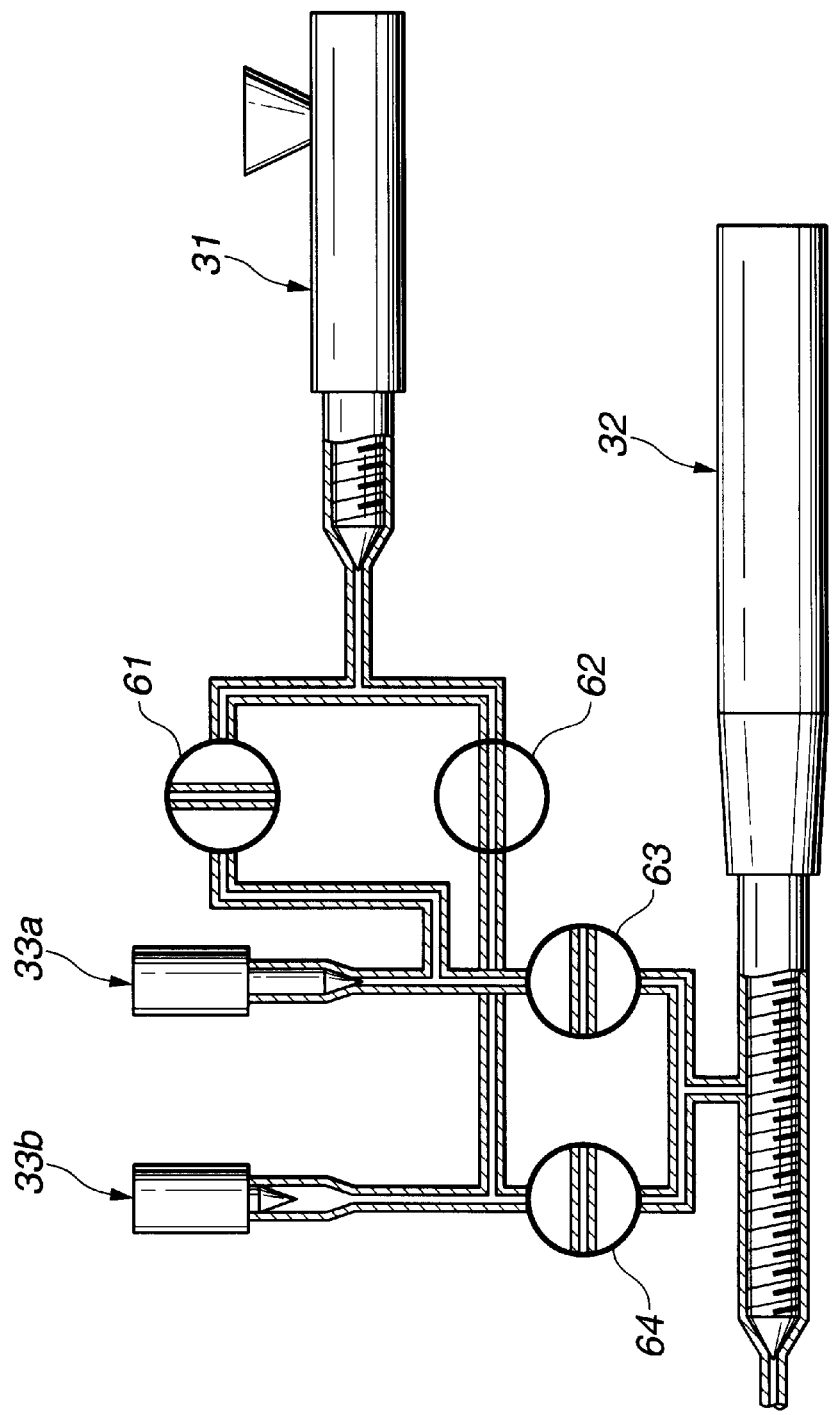
FIG. 6 is a side view of an injection molding machine, showing a second step of the process according to a second preferred embodiment of the present invention.
Figure 7:
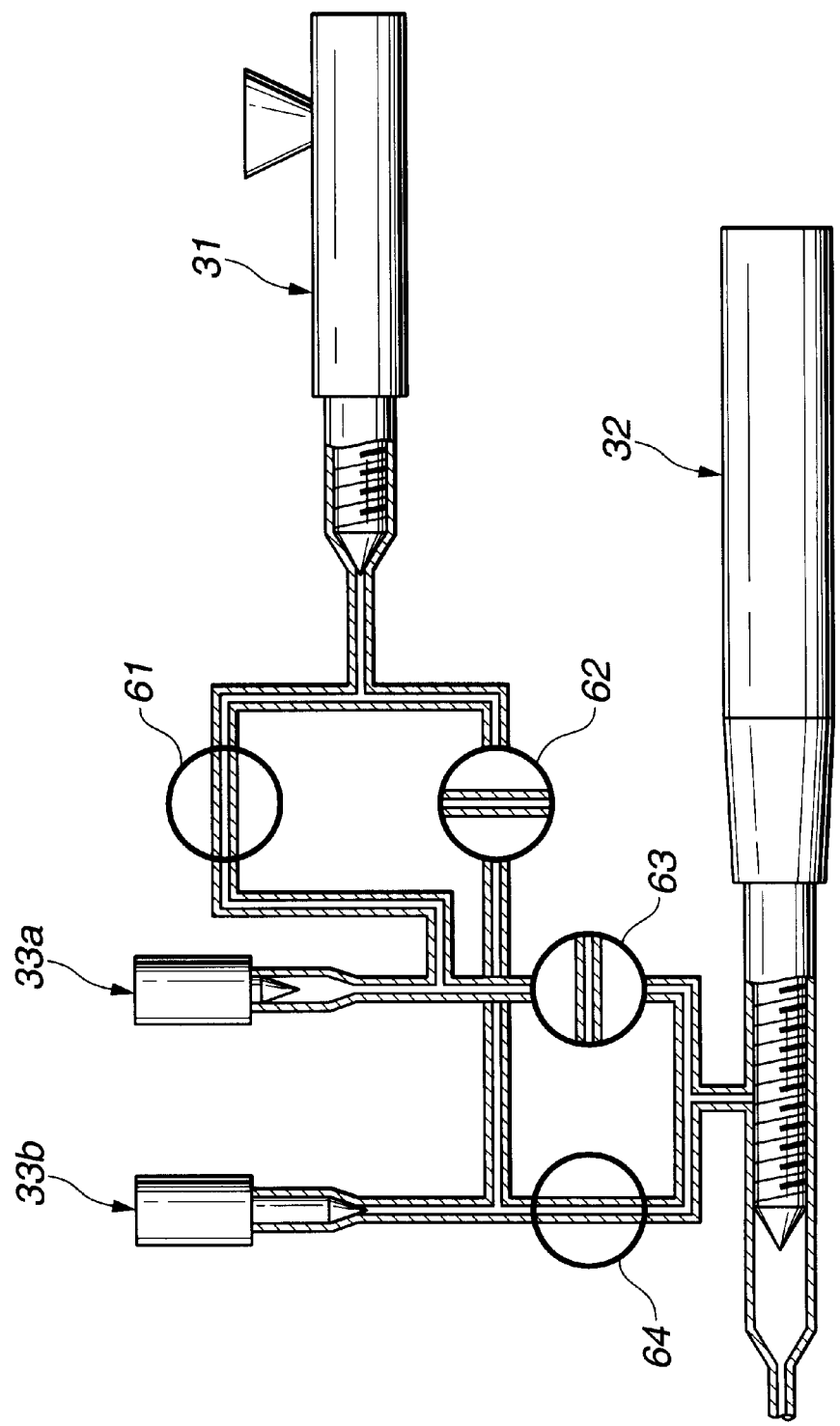
FIG. 7 is a side view of an injection molding machine, showing a third step of the process according to a second preferred embodiment of the present invention.
Figure 8:
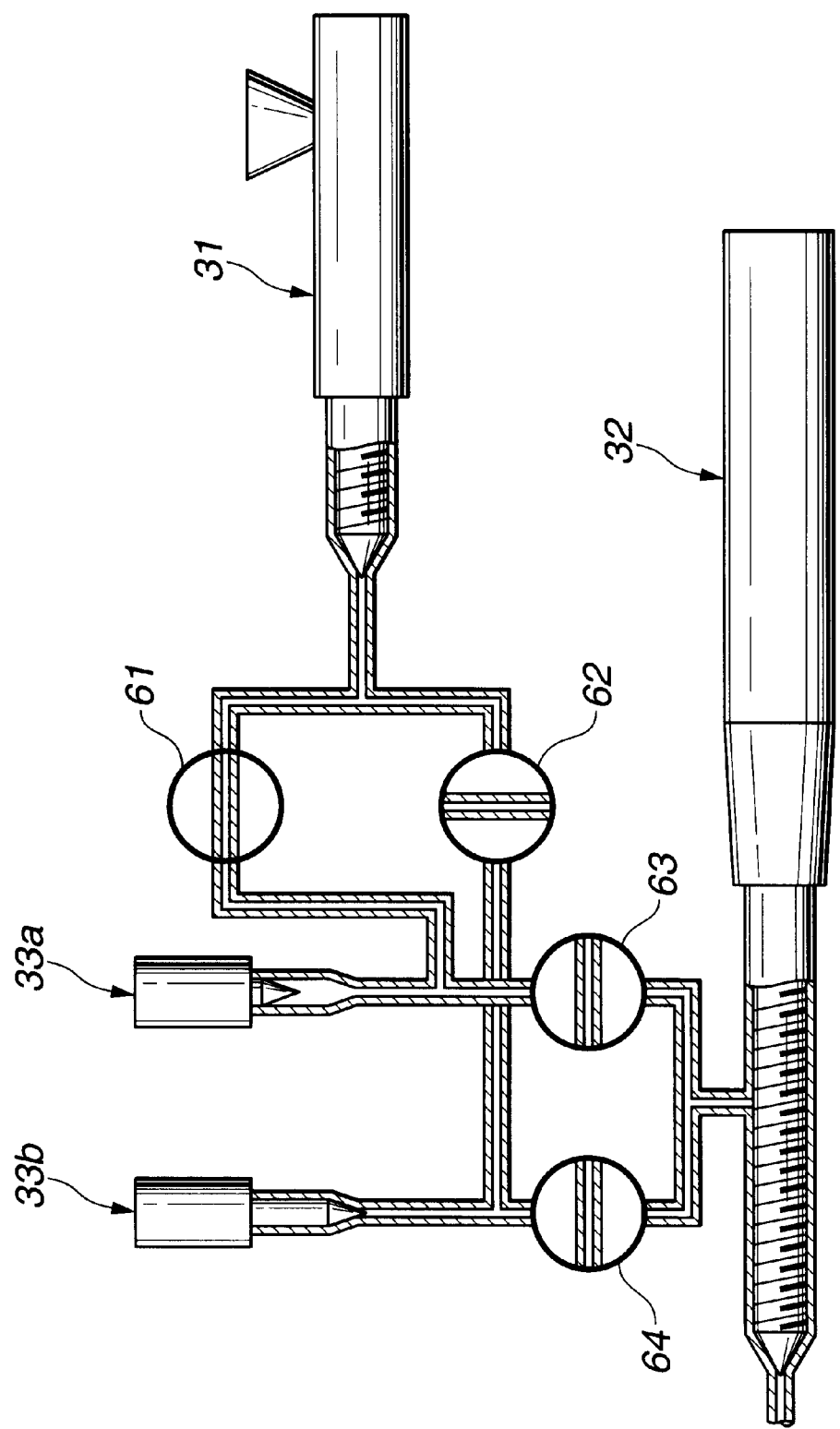
FIG. 8 is a side view of an injection molding machine, showing a fourth step of the process according to a second preferred embodiment of the present invention.

Therefore, by appropriately controlling operations of these switching valves 61 to 64, the feeding step as shown in FIG. 5, the injection step as shown in FIG. 6, the feeding step as shown in FIG. 7 and the injection step as shown in FIG. 8 can be performed in the same manner as described in the first preferred embodiment. The other arrangement, functions and effects of the second preferred embodiment are the same as those of the first preferred embodiment.

Figure 9:
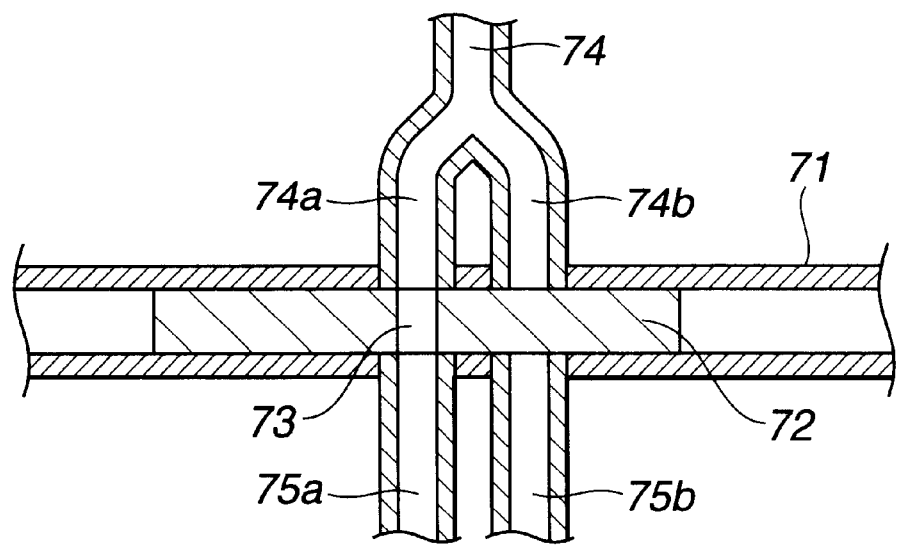
FIG. 9 is a schematic representation of a plunger-type valve, showing one switching condition thereof in the process according to a third preferred embodiment of the present invention.
Figure 10:
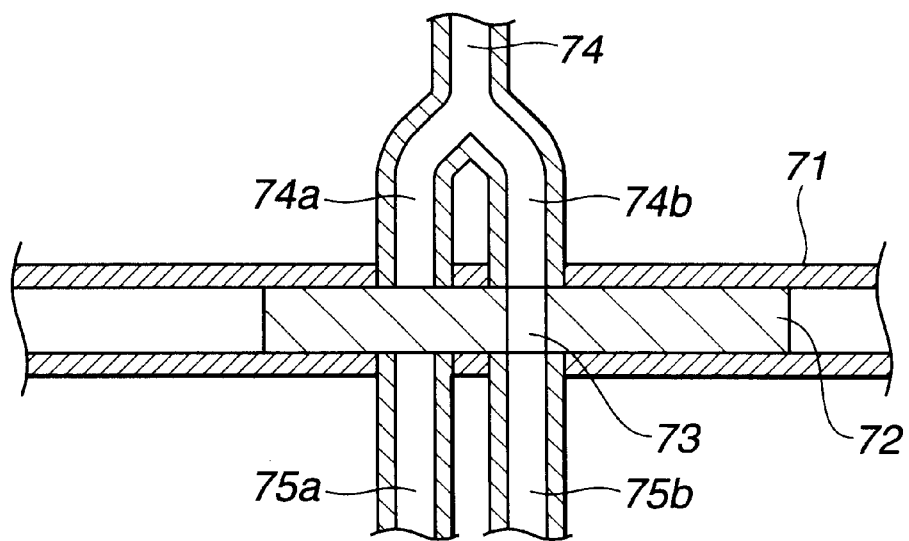
FIG. 10 is a schematic representation of a plunger-type valve, showing another switching condition thereof in the process according to a third preferred embodiment of the present invention.
Figure 11:
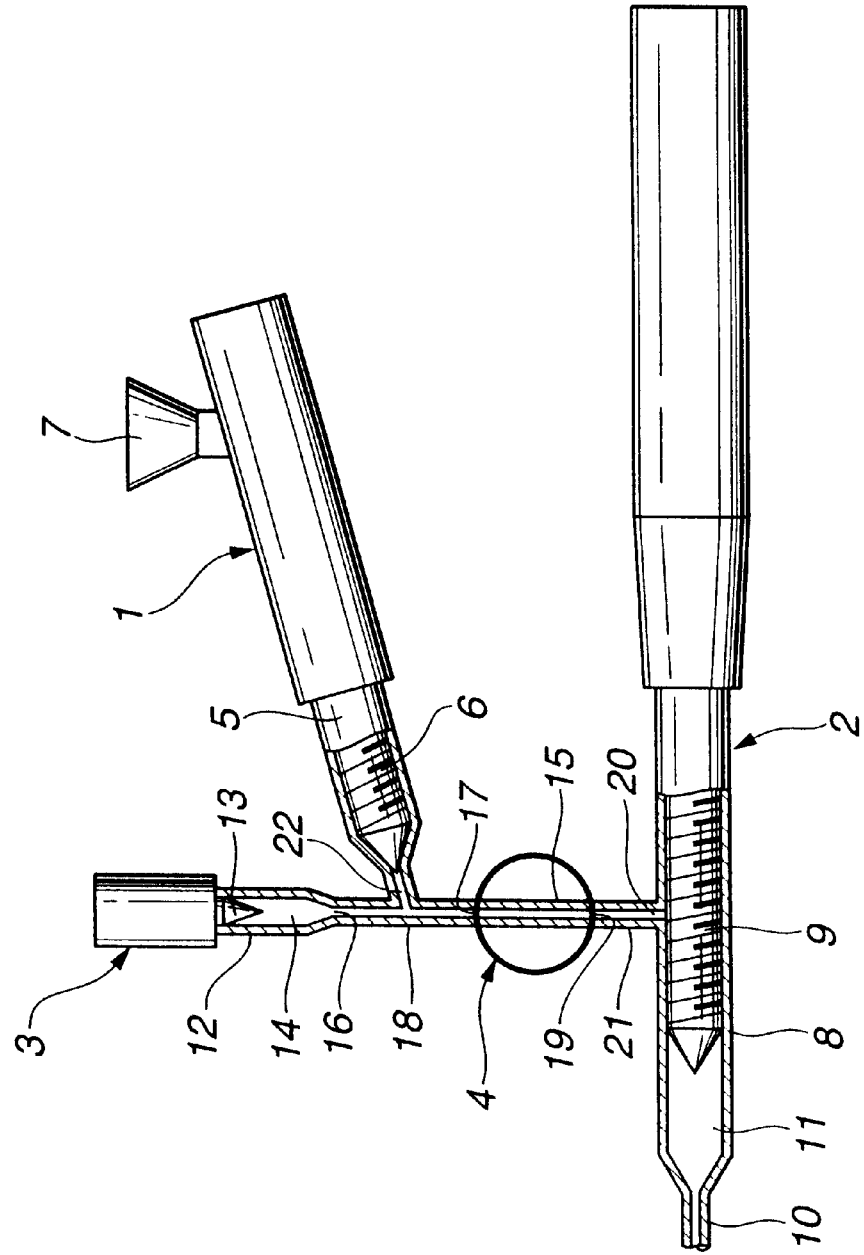
FIG. 11 is a side view of a prior art injection molding machine, showing one step of a conventional process.
Figure 12:
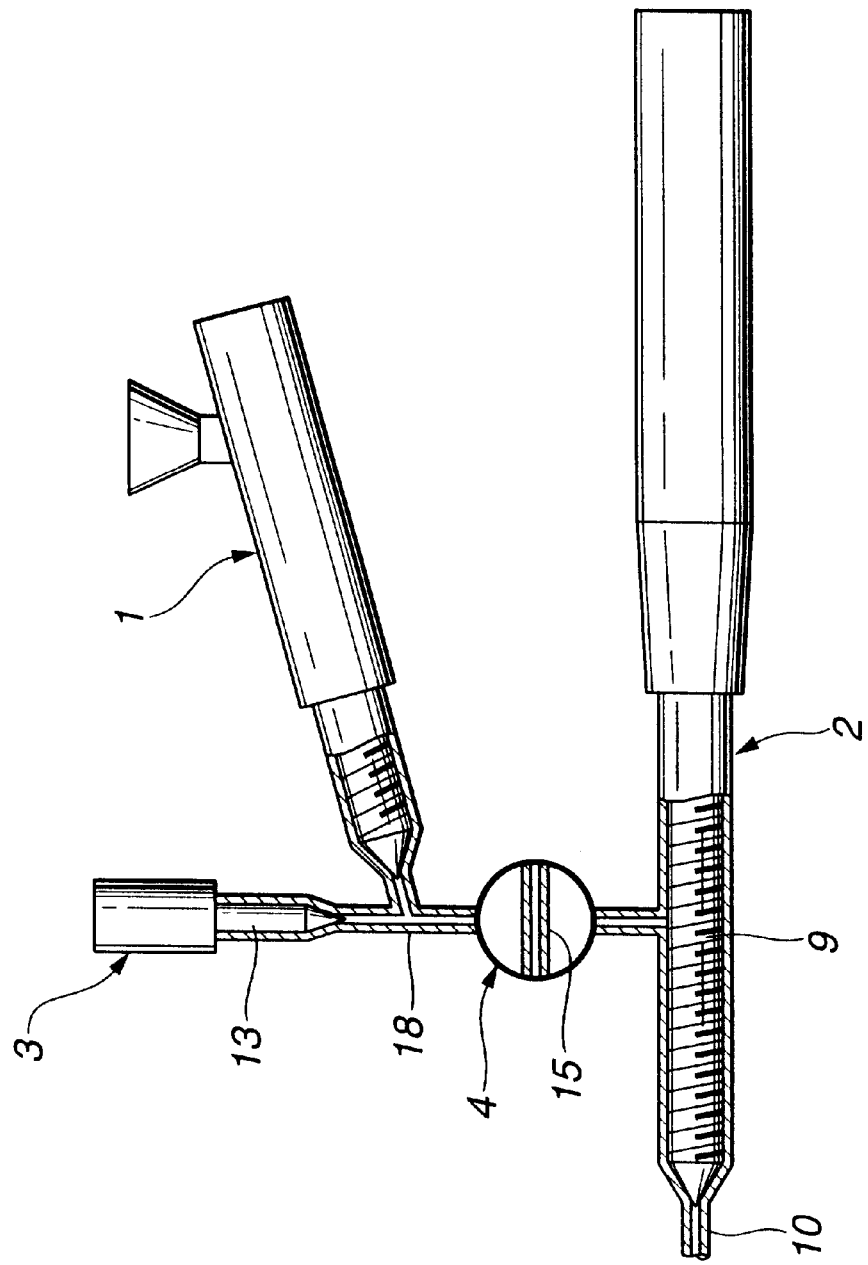
FIG. 12 is a side view of a prior art injection molding machine, showing a subsequent step of a conventional process.

The injection molding machine according to the third preferred embodiment of the present invention has the same structure as described in the above first preferred embodiment except that the reservoir switching means 34 and the feed switching means 35 of the first preferred embodiment (as shown in FIGS. 1 to 4) are replaced with plunger-type valves as shown in FIGS. 9 and 10.

Each of the plunger-type valves as directional control valves comprises a cylinder 71 and a cylindrical valve body 72 having a through hole 73 and being slidably accommodated in the cylinder 71. In FIG. 9, passages 74*a* and 75*a* are communicated with each other through the through hole 73 of the cylindrical valve body 72. Whereas, in FIG. 10 where the cylindrical valve body 72 is moved rightward, passages 74*b* and 75*b* are communicated with each other through the through hole 73 of the cylindrical valve body 72.

By appropriately shifting the position of the plunger-type valve, it is possible to conduct the feeding steps and the injection steps in the same manner as described in the first preferred embodiment.

As described above, in accordance with the injection molding process and injection molding machine according to the present invention, the feed pressure of the kneaded material fed from the reservoir device to the injection device is not transmitted to the kneader, thereby obtaining a uniform and stable kneaded material. As a result, it becomes possible to produce an injection-molded product exhibiting a uniform and stable quality.

Accordingly, the present invention is suitably used in application fields where the production of injection-molded products without uneven quality is strictly required. For instance, the present invention is suitably applied for uniformly kneading particles and a binder resin together and for producing an injection-molded product having a uniform quality. More specifically, the present invention is suitable for producing a plastic bonded magnet from magnetic particles as the particles and a binder resin.

Especially, the plastic bonded magnet is generally required to be uniform in shape, dimension, appearance as well as magnetic properties. In order to satisfy these requirements, it is essential to obtain a uniform kneaded material (upon kneading and plasticizing). When the uniformity of the kneaded material is insufficient, the dispersibility of the magnetic particles and the melt viscosity of the kneaded material are considerably varied, thereby failing to obtain a plastic bonded magnet having stable magnetic properties as well as uniform shape and dimension.

Further, the melt viscosity of the kneaded material is considerably influenced by heat history of the binder resin. The thermal degradation of the resin causes the decrease in molecular weight thereof, resulting in low melt viscosity of the kneaded material. Alternatively, there is risen the cross-linkage in the molecule of the binder resin, thereby increasing the viscosity of the kneaded material. That is, notwithstanding the molecule and the distribution thereof of the binder resin are the same, the different heat history causes the difference of the melt temperature of the binder resin, resulting in the difference of the melt viscosity of the kneaded material.

Therefore, when kneaded materials having different heat histories, i.e., different melt viscosity values are injection-molded together, the obtained injection-molded product inevitably suffers from non-uniform magnetic properties and shrinkage percentage. The fluctuation in shrinkage percentage of the injection-molded product fails to ensure an aimed dimensional accuracy thereof.

The magnetic particles used in the present invention are not particularly restricted. Examples of the suitable magnetic particles may include magnetic metal particles, e.g., particles of hard ferrite such as strontium ferrite, barium ferrite and rare earth element-containing ferrite; particles of soft ferrite such as manganese-zinc-iron alloys and nickel-zinc-iron alloys; iron particles; nickel particles; carbonyl iron particles; and intermetallic compounds particles such as silicon-iron compounds, iron-nickel compounds and iron-aluminum compounds. These magnetic particles may be used alone or in the form of a mixture of any two or more thereof.

The binder resins used in the present invention are not particularly restricted. Examples of the suitable binder resins may include polyamide resins such as nylon-6 and nylon-12; polyphenylenesulfide (PPS) resins; thermoplastic elastomer (TPE) resins; liquid crystal resins; ethylene-ethyl acrylate (EEA) resins; polycarbonate resins; chlorinated polyethylene resins; or the like. Their binder resins may be used alone or in the form of a mixture of any two or more thereof.

It is preferred that the kneaded material comprises 70 to 92% by weight of the magnetic particles and a balance of the binder resin. When the content of the magnetic particles is less than 70% by weight based on the weight of the kneaded material, the obtained kneaded material cannot exhibit sufficient magnetic properties. When the content of the magnetic particles is more than 90% by weight based on the weight of the kneaded material, the obtained kneaded material is deteriorated in moldability.

In accordance with the present invention, since the two reservoir devices as well as the reservoir switching means and the feed switching means are provided to conduct alternate temporary storage of the kneaded material in these reservoir devices and alternate feeding of the kneaded material from the reservoir devices to the injection device, and to repeat the above-mentioned operations, the kneading can be stably performed without being adversely affected by the feed pressure from the reservoir devices. Therefore, the obtained injection-molded product is free from uneven properties and can exhibit a good quality.

EXAMPLES

The present invention will now be described in more detail with reference to the following examples and comparative examples. However, these examples are not intended to limit the present invention thereto.

Meanwhile, in the following examples and comparative examples, "%" and "parts" represent "% by weight" and "part by weight", respectively, unless otherwise specified.

Example 1

87% of strontium ferrite obtained by treating 100 parts of strontium ferrite with 0.3 part of a silane coupling agent was mixed with 13% of nylon-6 resin particles to obtain a kneaded material. 100 parts of the obtained kneaded material was mixed with 0.2 part of a lubricant, and the resultant mixture was injection-molded using the injection molding machine shown in FIGS. 1 to 4, thereby obtaining an injection-molded magnet rolls. As the kneader, there was used a kneading machine "100-35VX(6) Model" (manufactured by KCK Co., Ltd.), and as the injection device, there was used an injection molding machine "FN3000" (manufactured by Nissei Jushi Kogyo Co., Ltd.). As shown in Table 1, the shrinkage percentage and magnetic force range of the obtained magnet rolls could satisfy the aimed values.

Comparative Example 1

A magnet rolls were produced using the apparatus and method described in Japanese Patent Application Laid-Open (KOKAI) No. 9-295329(1997). As shown in Table 1, the shrinkage percentage and magnetic force range of the obtained magnet rolls could not satisfy the aimed values.

TABLE 1

| Examples and Comparative Examples | Average shrinkage percentage (%) | Variation of shrinkage percentage (%) | Magnetic force range (Gauss) (primary pole) | Evaluation of properties |
|---|---|---|---|---|
| Example 1 | 0.7 | 0.10 | 839 to 876 | Good |
| Comparative Example 1 | 0.85 | 0.30 | 832 to 913 | Considerably uneven |

In accordance with the present invention, it is preferred that the shrinkage percentage of the magnet rolls is not more than 0.8%, more preferably not more than about 0.7% and the magnetic force range of the magnet rolls is 830 to 900 Gauss (83 to 90 mT), more preferably 830 to 890 Gauss (83 to 89 mT), still more preferably 830 to 880 Gauss (83 to 88 mT). In addition, it is preferred that the variation of the shrinkage percentage of the magnet rolls is not more than about 0.15%, more preferably not more than 0.1% and the variation of the magnetic force range of the magnet rolls is not more than 70 Gauss (not more than 7 mT), more preferably not more than 60 Gauss (not more than 5 mT), still more preferably not more than 50 Gauss (not more than 4 mT).

What is claimed is:

1. A process for injection-molding a composite resin composition using an injection-molding machine comprising:

a kneader for kneading particles with a binder resin;

a pair of reservoir devices (A) and (B) for temporarily storing the kneaded material supplied from the kneader;

an injection device for injection-molding the kneaded material, the kneaded material temporarily stored in the reservoir devices (A) and (B) being alternately fed to the injection device;

a reservoir switching means connected between the kneader and the pair of reservoir devices (A) and (B), which are switchable for alternately storing the kneaded material in the reservoir devices (A) and (B); and a feed switching means connected between the pair of reservoir devices (A) and (B) and the injection device, which are switchable for alternately feeding the kneaded material from the reservoir devices (A) and (B) to the injection device, which process comprises (a) kneading particles and a binder resin in the kneader;

(b) feeding the obtained kneaded material to one (A) of the two reservoir devices through the reservoir switching means to store the material therein;

(c) feeding the kneaded material stored in the reservoir device (A) to the injection device wherein the kneaded material is then injection-molded, through the feed switching means, and simultaneously feeding the kneaded material from the kneader to the other reservoir device (B) through the reservoir switching means to store the material therein;

(d) feeding the kneaded material stored in the reservoir device (B) to the injection device wherein the kneaded material is then injection-molded, through the feed switching means, and simultaneously feeding the kneaded material from the kneader to the other reservoir device (A) through the reservoir switching means to store the material therein; and (e) repeating the steps (c) and (d).

2. A process according to claim 1, wherein the kneaded material comprises 70 to 92% by weight of magnetic particles as the particles and a balance of the binder resin.

3. A process according to claim 2, wherein the magnetic particles is hard ferrite particles, and the binder resin is a polyamide resin.

4. A process according to claim 1, wherein the feeding of the kneaded material from the kneader to the reservoir device (A) is conducted through a reservoir switching means while disconnecting the reservoir device (A) from the injection device by a feed switching means.

5. A process according to claim 1, wherein the feeding of the kneaded material from the reservoir device (A) to the injection device is conducted through a feed switching means by means of an extrusion plunger while disconnecting the reservoir device (A) from the kneader by a reservoir switching means.

6. A process according to claim 1, wherein the feeding of the kneaded material from the kneader to the reservoir device (B) is conducted through a reservoir switching means while disconnecting the reservoir device (A) from the injection device by a feed switching means.

7. A process according to claim 1, wherein the feeding of the kneaded material from the reservoir device (B) to the injection device is conducted through a feed switching means by means of an extrusion plunger by disconnecting the reservoir device (B) from the kneader by a reservoir switching means.

8. A process according to claim 1, wherein the injection molding of the kneaded material by the injection device is conducted while disconnecting the reservoir devices (A) and (B) from the injection device by a feed switching means.

* * * * *